(12) United States Patent
Frederiks et al.

(10) Patent No.: US 7,631,240 B2
(45) Date of Patent: Dec. 8, 2009

(54) BLOCK ACK PROTOCOLS FOR WIRELESS PACKET NETWORK

(75) Inventors: Guido Robert Frederiks, Campbell, CA (US); Vincent K. Jones, Redwood City, CA (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 481 days.

(21) Appl. No.: 11/371,185

(22) Filed: Mar. 7, 2006

(65) Prior Publication Data

US 2006/0239213 A1 Oct. 26, 2006

Related U.S. Application Data

(60) Provisional application No. 60/659,467, filed on Mar. 7, 2005.

(51) Int. Cl.
*H04L 1/18* (2006.01)
(52) U.S. Cl. ........................ 714/748; 714/776; 370/278; 370/282
(58) Field of Classification Search ......... 714/748–751, 714/776; 370/278, 348, 282
See application file for complete search history.

(56) References Cited

U.S. PATENT DOCUMENTS

| | | | |
|---|---|---|---|
| 6,546,001 B1 * | 4/2003 | Semper et al. ............. | 370/349 |
| 7,010,592 B2 * | 3/2006 | Ogishi et al. .............. | 709/224 |
| 2004/0082356 A1 | 4/2004 | Walton et al. | |
| 2004/0179627 A1 | 9/2004 | Ketchum et al. | |
| 2006/0193279 A1 * | 8/2006 | Gu et al. ................... | 370/312 |
| 2007/0191052 A1 * | 8/2007 | Kneckt et al. ............. | 455/522 |

OTHER PUBLICATIONS

International Search Report dated Aug. 31, 2007 for PCT Application Serial No. PCT/US06/08191, 2 Pages.
Written Opinion - PCT/US06/008191, International Searching Authority - US, Alexandria, Va 08-31-07.

\* cited by examiner

*Primary Examiner*—Guy J Lamarre
(74) *Attorney, Agent, or Firm*—Kenneth K. Vu; Kenyon S. Jenckes (57) ABSTRACT

Circuits, methods, and apparatus that reduce overhead and channel bandwidth required for data reception acknowledgment. One such system uses an enhanced block acknowledgment that acknowledges frames received for different data streams. Another system sends an acknowledgment after the occurrence of a triggering event, such as the end of a duration, the reception of a number of frames, or the reception of a frame having a specific sequence number. Another removes the need for acknowledgment frames by including an acknowledgment field in a transmitted data frame. These block acknowledgments and acknowledgment fields may include an acknowledgement of frames received for each data stream having different traffic identifications, they may be for all received frames or for a specific class or groups of classes of traffic, for specific user priorities, or for other subgroups of received frames, and more that one acknowledgment may be included.

29 Claims, 7 Drawing Sheets

| 2 | 2 | 6 | 6 | 2 | 4-X | 4 |
|---|---|---|---|---|---|---|
| FRAME CONTROL 370 | DURATION 371 | RA 372 | TA 373 | BA CONTROL ENHANCE=1 374 | TID BLOCK ACK RESPONSES 376 | FCS 377 |

Figure 3D

| B0 | B3 B4 | B15 B16 | B23 B24 | B24+SIZE | ROUNDING TO MULTIPLE OF 8 |
|---|---|---|---|---|---|
| TID 410 | STARTING NUMBER 420 | BITMAP SIZE 430 | BIPMAP 440 | RESERVED 450 | |

BLOCK ACK PROTOCOLS FOR WIRELESS PACKET NETWORK

BACKGROUND

The present invention generally relates to block acknowledgment protocols in a multiple-input multiple-output (MIMO) wireless network, and more particularly to the reduction of overhead and channel bandwidth consumed by block acknowledgment signaling.

The demand for increased bandwidth in wireless networks has been relentless the past several years and shows no signs of abating. Fortunately, Airgo Networks, Inc. of Palo Alto, Calif. has been developing products for wireless networks that meet these demands. In fact, these products have reached an important threshold. Multiple-input and multiple-output (MIMO) networks developed by Airgo Networks are the first to achieve the 100 Mbit data rates needed for streaming video for home entertainment and other high data-rate applications. To achieve this incredible data rate, significant improvements over conventional circuits and techniques have been developed.

As an example, in conventional networks, after data is transmitted from a first station to a second station, the second station responds with an acknowledgement frame indicating that the data transmission was properly executed. To simplify matters, the required overhead may be reduced by using block acknowledgments. In this case, a first station transmits several frames of data to a second station. The first station then requests an acknowledgment from the second station by sending a block acknowledgment request. The second station then replies by sending a block acknowledgment. Though these block acknowledgments improve matters, further enhancements are possible.

In a network, different types of data are identified by a different traffic identification (TID). The acknowledgement of the reception of frames having different TIDs consumes a considerable amount of channel bandwidth. Unfortunately, any channel bandwidth used for acknowledgment signaling is bandwidth that is not otherwise available for data transmission.

Thus, what is needed are circuits, methods, and apparatus that reduce the overhead and channel bandwidth required for block requests and acknowledgments.

SUMMARY

Accordingly, embodiments of the present invention provide circuits, methods, and apparatus that reduce the overhead and channel bandwidth required for the acknowledgment of data reception. An exemplary embodiment of the present invention provides an enhanced block acknowledgement frame. This enhanced block acknowledgment can be differentiated from a conventional block acknowledgement by setting one or more reserved bits to a specific state. The reserved bits may be in a block acknowledgement (BA) control, frame control, or other appropriate field. Alternately, one or more other bits or characteristics of the enhanced block acknowledgment frame may be varied to differentiate it from a conventional block acknowledgement.

The enhanced block acknowledgment may include an acknowledgement of frames received for each data stream having a different characteristic such as a different traffic identification. The acknowledgment may be for all received frames, for a specific class or groups of classes of traffic, for specific user priorities, or for other subgroups of received frames, and more than one such acknowledgment may be included. In a specific embodiment of the present invention, an enhanced block acknowledgment includes a TID block acknowledgment for each data stream received. A block acknowledgment request field may be similarly enhanced. In this way, the overhead and channel bandwidth consumed by acknowledgment handshaking is reduced.

Another exemplary embodiment of the present invention reduces this overhead by removing the need for block acknowledgment requests. Instead of sending an acknowledgment following a request, this embodiment sends an acknowledgment after the occurrence of a triggering event. For example, an acknowledgement may be sent after a specific duration passes. This duration may be predetermined, or it may be varied or set as a function of one or more system parameters such as, but not limited to, the number of transmitting antennas, the number of receiving antennas, or received signal strength. Alternately, an enhanced block acknowledgment may be sent after the reception of a number of frames, or one may be sent after a frame having a specific sequence number is received. In these embodiments, a time limit may be imposed, such that if the number of frames is not reached within the limit, an enhanced block acknowledgment is sent. This prevents a condition where a transmitter does not learn of an error in transmission for an undesirable length of time. The acknowledgment sent may be an enhanced block acknowledgment as described above, or it may be another block acknowledgment, such as a conventional block acknowledgment.

In these various embodiments, an enhanced block acknowledgment may be a delayed enhanced block acknowledgment. That is, following a request or triggering event, an acknowledgment may be transmitted. This acknowledgment may be a conventional or other acknowledgment that does not included the same amount of detailed information such as TIDs as an enhanced block acknowledgment. This simpler acknowledgment can then be followed by an enhanced block acknowledgment.

Yet another exemplary embodiment of the present invention removes the need for acknowledgment frames. Instead of block acknowledgment frames the acknowledgment can be included in a transmitted data frame. The acknowledgement may be included in the first frame following a reception of data, and it may indicate an acknowledgment of data received by a station since that station's last transmission. As before, this acknowledgment may include an acknowledgement of frames received for each data stream having different traffic identifications. The acknowledgment may be for all received frames, for a specific class or groups of classes of traffic, for specific user priorities, or for other subgroups of received frames. Also, more than one such acknowledgment may be included. Various embodiments of the present invention may incorporate one or more of these or the other features described herein.

An exemplary embodiment of the present invention provides a method of transferring data across a wireless network. This method includes receiving a first data structure having a first characteristic, receiving a second data structure having a second characteristic, receiving a request for acknowledgement that the first data structure having the first characteristic and second data structure having the second characteristic were received, and transmitting an acknowledgment that the first data structure having the first characteristic and the second data structure having the second characteristic were received.

Another exemplary embodiment of the present invention provides another method of transferring data across a wireless network. This method includes receiving a first data frame having a first traffic identification, receiving a second data frame having a second traffic identification, and transmitting an acknowledgment that the first data frame having the first traffic identification and the second data frame having the second traffic identification were received.

Still another exemplary embodiment of the present invention provides a method of transferring data across a wireless network. This method includes, with a first station, transmitting a first data frame having a first traffic identification, with the first station, transmitting a second data frame having a second traffic identification, with a second station, receiving the first data frame having the first traffic identification and the second data frame having the second traffic identification, and transmitting an acknowledgment that the first data frame having the first traffic identification and the second data frame having the second traffic identification were received by the second station, and with the first station, receiving the acknowledgment that the first data frame having the first traffic identification and the second data frame having the second traffic identification were received by the second station.

Yet another exemplary embodiment of the present invention provides another method of transferring data across a wireless network. This method includes transmitting a first frame, receiving a second frame having a first traffic identification, receiving a third frame having a second traffic identification, and transmitting a fourth frame. The fourth frame comprises an acknowledgement that the second frame having the first traffic identification and the third frame having the second traffic identification were received.

A better understanding of the nature and advantages of the present invention may be gained with reference to the following detailed description and the accompanying drawings.

BRIEF DESCRIPTION OF THE DRAWINGS

FIG. 2C illustrates an example of a delayed block acknowledgment frame, while

FIG. 3C illustrates a delayed enhanced block acknowledgment according to an embodiment of the present invention, while

FIG. 5C illustrates a method according to an embodiment of the present invention where an enhanced block acknowledgment frame is sent after a specific sequence number has been reached; while

DESCRIPTION OF EXEMPLARY EMBODIMENTS

Figure 1:
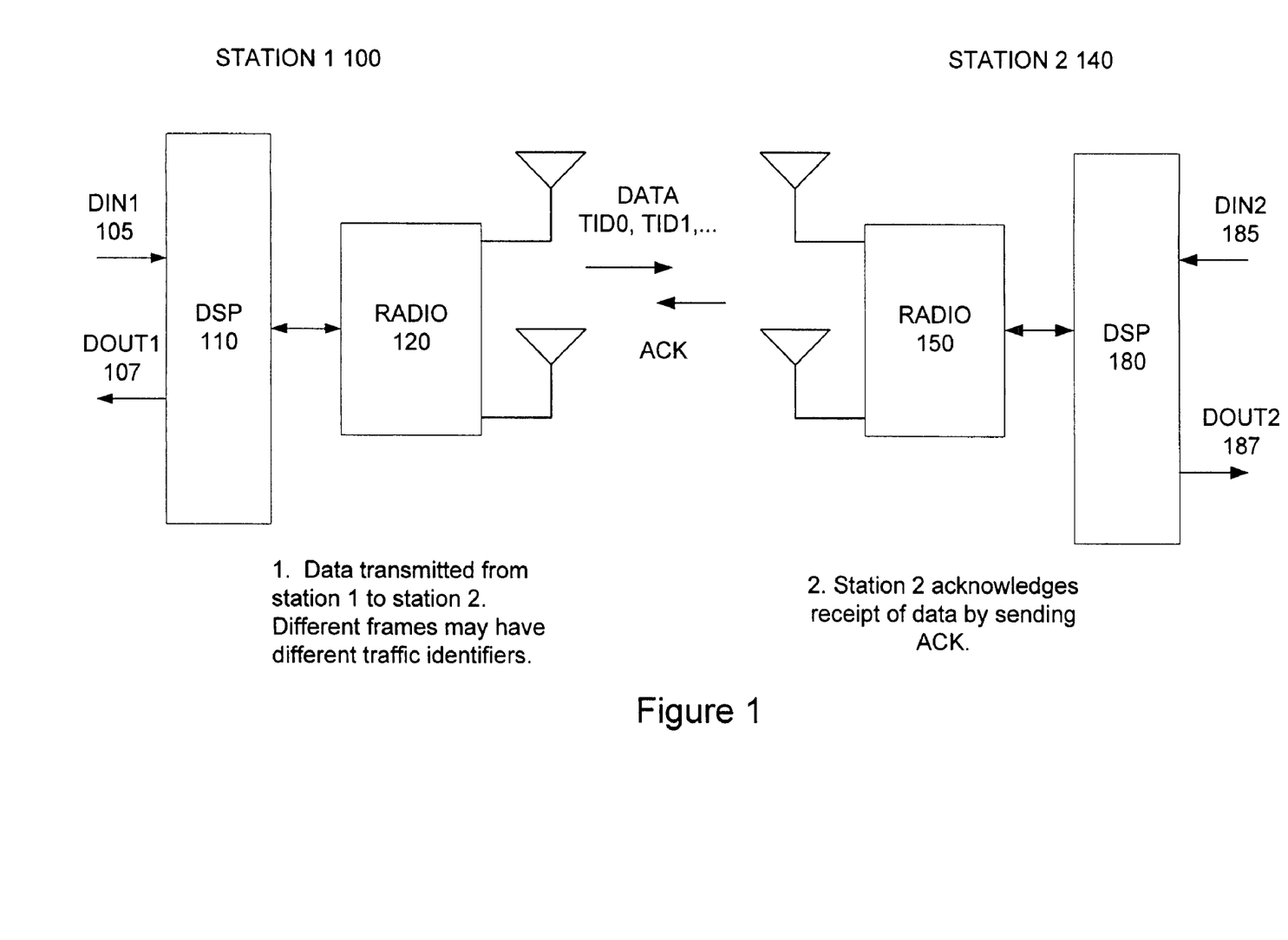
FIG. 1 illustrates a wireless network that may be improved by incorporating an embodiment of the present invention.

FIG. 1 illustrates a wireless network that may be improved by the incorporation of an embodiment of the present invention. This wireless network may be a multiple-input multiple-output (MIMO) or other type of wireless network. This figure includes a first station, station 1 100, which is shown transmitting data to a second station, station 2 140. Station 2 140 is shown acknowledging reception of the data to station 1 100. The first station, station 1 100, includes a digital signal processing circuit 110, which provides data to a radio 120. The second station, station 1140, includes a radio 150 that provides data to a digital signal processing circuit 180. This figure, as with the other included figures, is shown for illustrative purposes and does not limit either the possible embodiments of the present invention or the claims.

Each of these stations, station 1 100 and station 2 140, may be included on a network interface card (NIC), motherboard, or may otherwise in communication with a computing or other electronic system. Alternately, one or both may be included on a wireless router, wireless access point, print server, storage device, or other networking or networked device.

The data sent from station 1 100 to station 2 140 can include several different data types. For example, the transmitted frames may include audio, video, ftp, and other types of data. Each of these data types can be identified by a different TID. Data having different TIDs can be sent sequentially from station 1 100 to station 2 140, or from station 2 140 to station 1 100.

In this example, station 1 100 transmits data to station 2 140. Following this, station 2 140 sends an acknowledgment to station 1 100 indicating that the data has been received. An example of this handshaking is shown in the following figure.

Figure 2A:
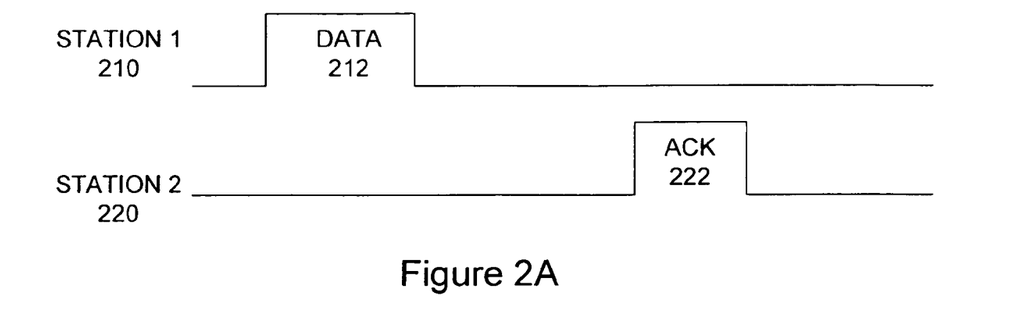
FIG. 2A illustrates an example of a handshaking routine that is improved by the incorporation of an embodiment of the present invention.

FIG. 2A illustrates an example of a handshaking routine that is improved by the incorporation of an embodiment of the present invention. In this example, data is sent from a first station to a second station and an acknowledgment is returned from the second station to the first station. Specifically, station 1 210 transmits data 212 to station 2. This data, as with the data in the other included figures, is a data structure that may be formed as a frame or packet of data. After data 212 has been transmitted, station 2 220 transmits an acknowledgment signaled 222 indicating the data 212 was properly received.

This acknowledgment process can consume excessive channel bandwidth if an acknowledgment is required each time data is sent. Accordingly, following the transmission of a number of a number of data packets, a block acknowledgment request can be made. This in turn can be responded to by a block acknowledgment. An example of this is shown in the following figure.

Figure 2B:
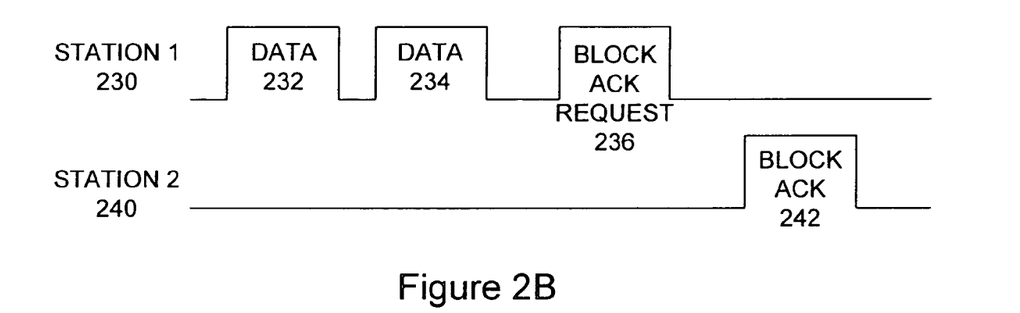
FIG. 2B illustrates an acknowledgement following the reception of a number of frames of data sent from a first station to a second station.

FIG. 2B illustrates an acknowledgement following the reception of a number of frames of data sent from a first station to a second station. Station 1 230 transmits a number of data frames including data 232 and 234. Following this, station 1 makes a block acknowledgment request 236. This is responded to by station 2 240, which transmits a block acknowledgment 242.

It may take some amount of time to calculate and format the needed block acknowledgment 242. Accordingly it is permissible for station 2 to transmit a conventional acknowledgment, which is followed by a delayed block acknowledgment frame. This delay gives station 2 time to calculate and format the needed block acknowledgment frame. An example is shown in the following figure.

Figure 2C:
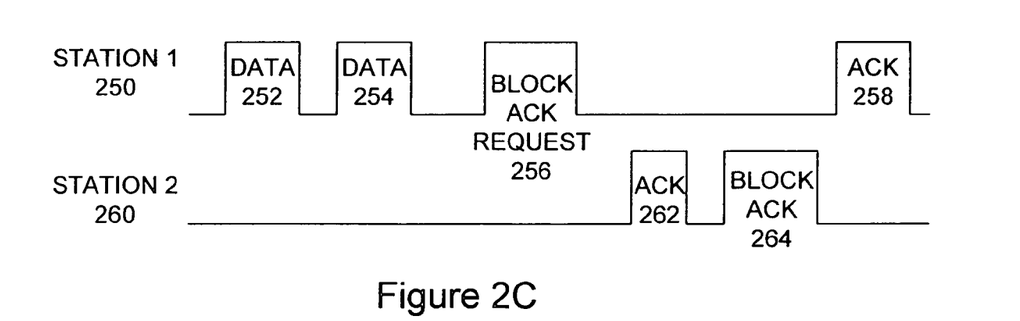

FIG. 2C illustrates an example of a delayed block acknowledgment frame. Again, a first or transmitting station sends data to a second or receiving station. Specifically, station 1 250 transmits a number of data frames including data 252 and 254. Following this, station 1 230 makes a block acknowledgment request 256.

Station 2 260 replies with an acknowledgment 262. Station 2 260 then sends a block acknowledgment frame 264 to station 1 250. Station 1 250 in turn transmits an acknowledgment 258 following its reception of block acknowledgment frame 264. Again, this delay provides time for station 2 260 to determine the needed block acknowledgment frame 264. An example of such a block acknowledgment is shown the following figure.

Figure 2D:
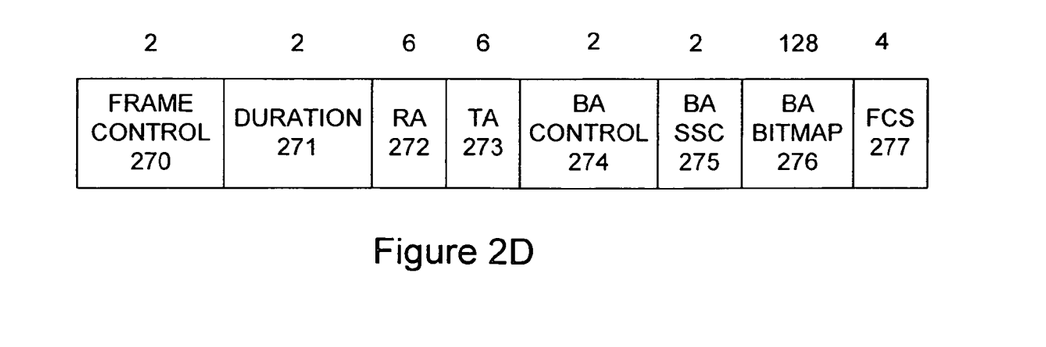
FIG. 2D illustrates a block acknowledgement frame that may be improved by the incorporation of an embodiment of the present invention.

FIG. 2D illustrates a block acknowledgement frame that may be improved by the incorporation of an embodiment of the present invention. In this figure, the frame size is 150 bytes and the allocation is shown by byte counts above each field of the frame. The block in the bitmap can provide acknowledgments for up to 1,024 frames.

The BA control field contains subfields that include a four bit TID value. The two bytes of the BA control field contain reserve bits that are typically set to zero. As will be seen below, one or more of these reserve bits may be designated as an enhanced bit for use in an enhanced block acknowledgment method. Alternately, one or more bits in another field, such as the frame control field may be used for this purpose. This enhancement reduces the number of acknowledgments required in a multiple-input multiple-output wireless system.

Specifically, when conventional acknowledgment methods are used in a multiple-input multiple-output wireless system, the resulting acknowledgment signaling requires an undesirable amount of overhead. Specifically, each transmitting station transmits one or more frames of a stream having a particular traffic identification value. The transmitting station then requests acknowledgment of the reception of frames in each of these streams. An acknowledgment for each of these streams is then sent. Accordingly, an embodiment of the present invention provides circuits, methods, and apparatus for reducing the overhead associated with these acknowledgments.

Figure 3A:
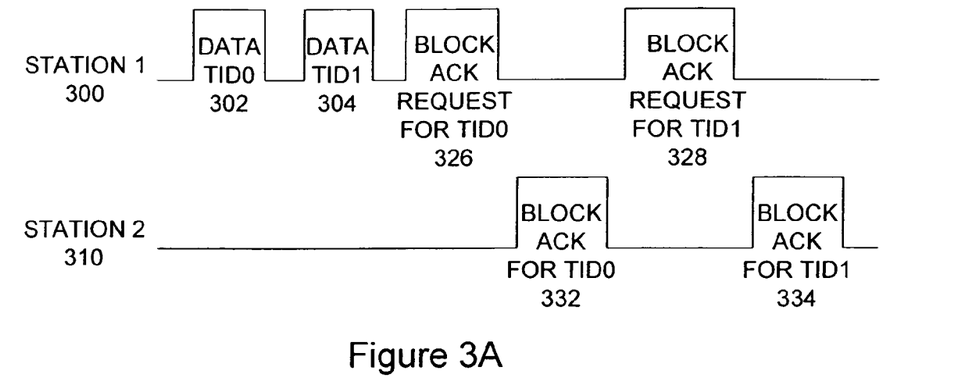
FIG. 3A illustrates the use of a block acknowledgment that is improved by the incorporation of an embodiment of the present invention.

FIG. 3A illustrates the use of a block acknowledgment that is improved by the incorporation of an embodiment of the present invention. This figure illustrates the excessive amount of acknowledgment overhead that is required by conventional systems. In this example, station 1 300 transmits frames 302 and 304 to station 2 310. These frames have different TIDs, specifically data frame 302 has a TID of 0 while data frame 304 has a TID of 1. Previous to the transmission of frame 302, other frames may have been transmitted from station 1 300 to station 2 310; only two frames are shown for simplicity.

Following the transmission of data frame 304, station 1 300 transmits a block acknowledgment request 326 for data having a TID of 0. This is responded to by station 2 310, which transmits a block acknowledgment for TID0 332. Similarly, station 1 300 transmits a block acknowledgment request 328 for data having a TID of 1. This is responded to by station 2 310, which transmits a block acknowledgment for TID1 334.

Again, this consumes a considerable amount of bandwidth of the available channel between the first and second stations. Accordingly, embodiments of the present invention provide an enhanced block acknowledgement that combines acknowledgments for multiple data streams having different TIDs. An example is shown in the following figure.

Figure 3B:
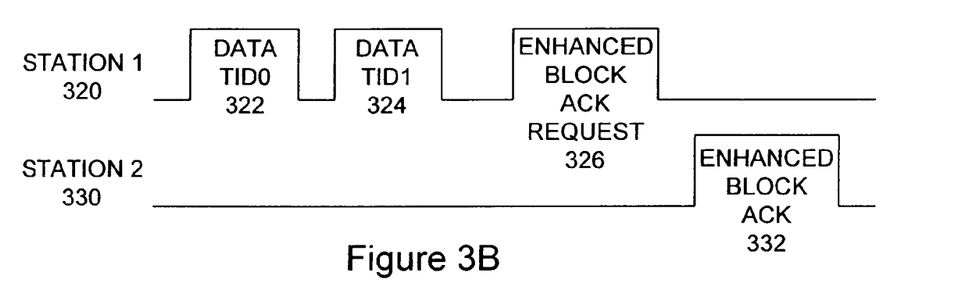
FIG. 3B illustrates the use of an enhanced block acknowledgment according to an embodiment of the present invention.

FIG. 3B illustrates the use of an enhanced block acknowledgment according to an embodiment of the present invention. In this example, a first or transmitting station transmits data to a second or receiving station. Again, two frames are shown for simplicity.

Specifically, station 1 320 transmits data frames 322 and 324. These frames have traffic ids of 0 and 1 respectively. Following these transmissions, station 1 transmits a block acknowledgment request 326. This in turn is responded to by station 2 350, which transmits an enhanced block acknowledgment 332. The enhanced block acknowledgement 332 provides an acknowledgment for each frame in each of the received streams, thereby reducing the required acknowledgment overhead.

Figure 3C:
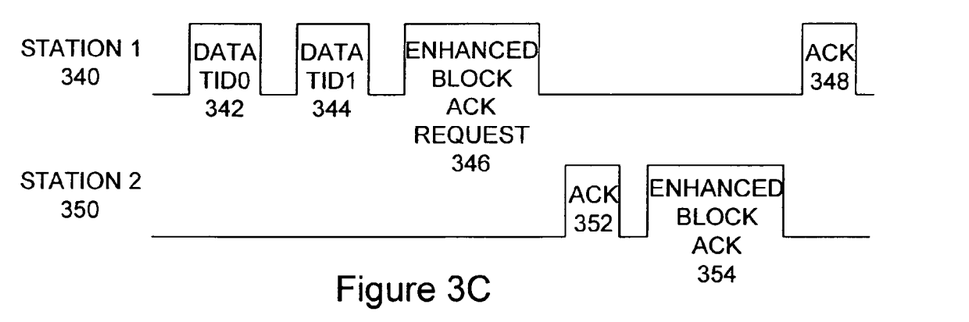

As before, this enhanced block acknowledgment frame may take some time to calculate and format. Accordingly, a delayed enhanced block acknowledgment may be used as shown in the following figure.

FIG. 3C illustrates the use of a delayed enhanced block acknowledgment according to an embodiment of the present invention. Again, a first or transmitting station transmits data to a second or receiving station. Specifically, station 1 340 transmits data frames including data frames 342 and 344, which have TIDs of 0 and 1 respectively. Following this, the first station transmits an enhanced block acknowledgment request 346. Station 2 350 then provides an acknowledgment 352. Following this, station 2 350 calculates and formats an enhanced block acknowledgment 354, which it then transmits to the first station. The first station, station 1 340 in turn transmits acknowledgment 348 in response to its reception of enhanced block acknowledgment 354. The acknowledgment 348 is a simple conventional acknowledgment, such as acknowledgment 352.

It can be seen that the use of an enhanced block acknowledgment 354 provides considerable channel bandwidth savings over conventional techniques. Specifically, using conventional techniques, station 1 340 transmits a separate block acknowledgment request for each TID. This is responded to with one or more acknowledgments such as acknowledgment 352 and a separate block acknowledgment for each TID by station 2 350. This in turn is responded to by one or more acknowledgments such as acknowledgment 348 transmitted by station 1 340. Use of an embodiment of the present invention greatly simplifies the required signaling thus freeing up channel bandwidth for data transmissions.

Again, the delay provided by the method of handshaking outlined in FIG. 3C allows time for station 2 350 to calculate and format the enhanced block acknowledgment 354. An example of such an enhanced a block acknowledgment is shown in the following figure.

Figure 3D:
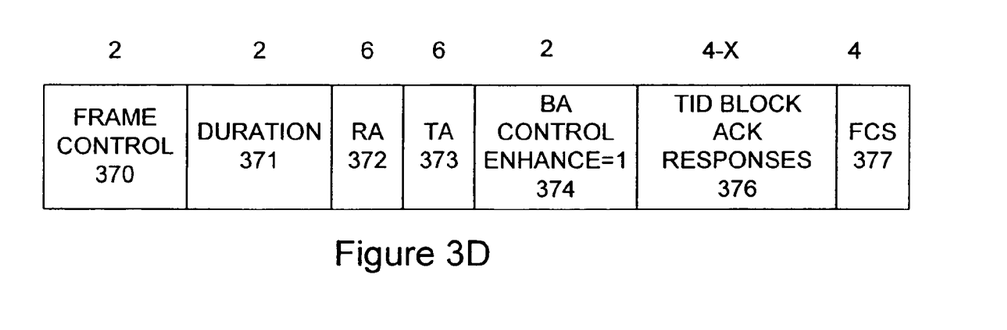
FIG. 3D illustrates a block acknowledgement according to an embodiment of the present invention.

FIG. 3D illustrates a block acknowledgement according to an embodiment of the present invention. The length of this block acknowledgment may be fixed or variable. As described above, one of the reserved bits in the BA control field 374 can be set to one. The TID block acknowledgment responses 376 is a variable length data field, where the length depends on the number of data streams received. The enhanced block acknowledgment requests may be similarly modified.

In this example, one or more reserved bits in the block acknowledgement field 374 is set such that this block acknowledgement can be recognized as an enhanced block acknowledgement. In other embodiments, one or more bits in one or more of this and the other fields may be used for this purpose. For example, one or more bits in the frame control field 370 may be used.

Figure 4:
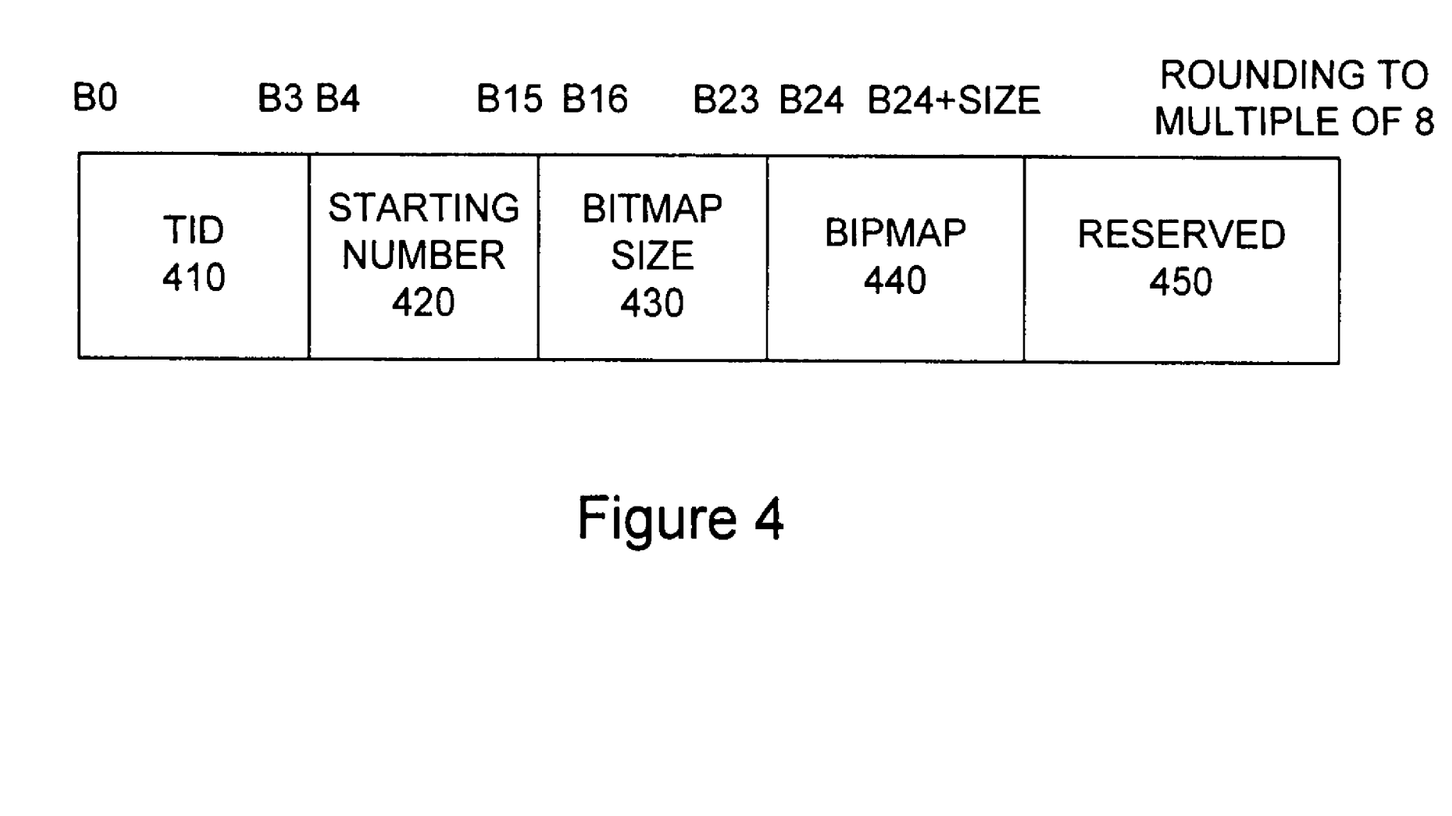
FIG. 4 illustrates a TID block acknowledgement response according to an embodiment of the present invention.

Again, the TID block acknowledgment response field 376 has a variable length depending on the number of TIDs to be acknowledged. An example of a TID block acknowledgment response field 376 for one stream is shown in the following figure.

FIG. 4 illustrates a TID block acknowledgement response according to an embodiment of the present invention. In this example, the bit assignments are shown above each individual field. These fields include the traffic identification 410, frame starting number 420, bitmap size 430, bitmap 440, and reserved bits 450. Reserved bits 450 are used to round off field size to an even number of bytes.

In the above embodiments of the present invention, a block acknowledgment is sent in response to a block acknowledgment request. Eliminating such requests may further improve channel utilization. This may be done by providing block acknowledgments the following a triggering event, as opposed to providing a block acknowledgment after receiving a request. For example, block acknowledgments may be transmitted following a period of time, following the reception of a number of frames, or following the reception of a frame having a specific sequence number. These block acknowledgments may be the same or similar to the enhanced block acknowledgments described above, or they may be other block acknowledgments, such as conventional block acknowledgements. Flowcharts illustrating these embodiments of the present invention are shown in the following figures, though other embodiments may use other triggering mechanisms.

Figure 5A:
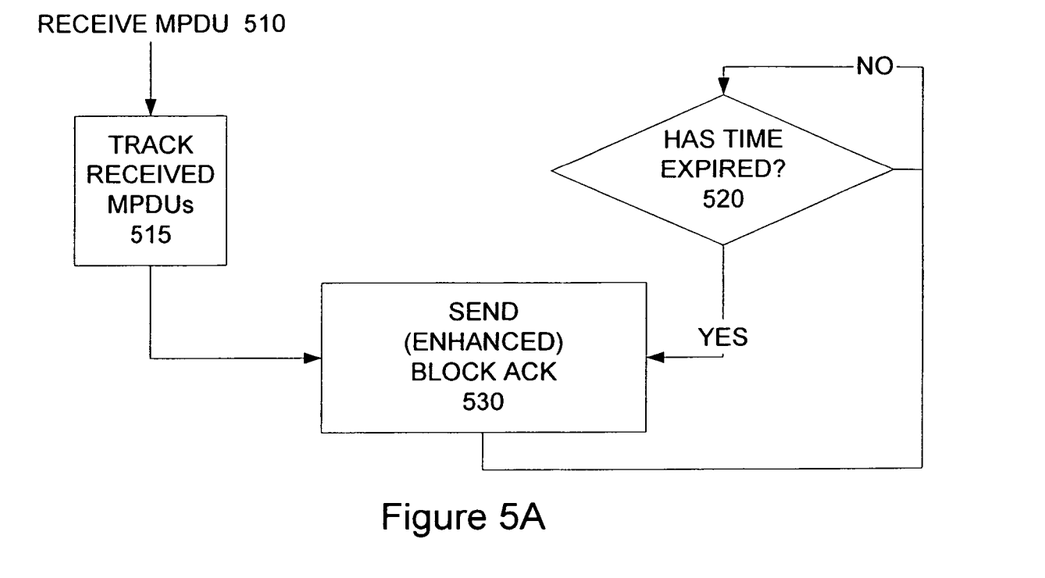
FIG. 5A illustrates a method according to an embodiment of the present invention where a enhanced block acknowledgment frame is transmitted on a periodic or aperiodic basis according to an embodiment of the present invention.

FIG. 5A illustrates a method according to an embodiment of the present invention whereby a block acknowledgment frame is transmitted on a periodic or aperiodic basis according to an embodiment of the present invention. Frames are received in act 510. These frames are tracked in act 515. At the same time, it is determined in act 520 whether a specific duration has expired. This time may be predetermined, or may be variable. For example it may be variable based on a number of transmitting antennas, a number of receiving antennas, signal strength, or other system parameter. Once time has expired, a block acknowledgement frame is received in act 530. Again, the block acknowledgement may be an enhanced block acknowledgement as described above or other type of block acknowledgement.

Figure 5B:
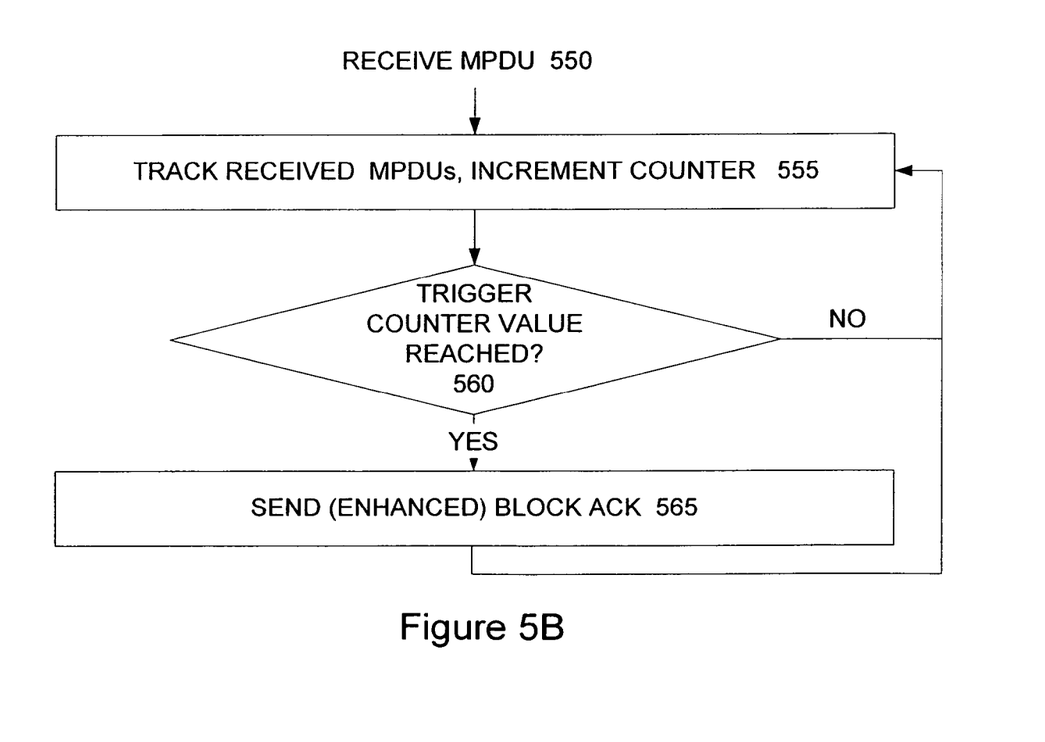
FIG. 5B illustrates a method according to an embodiment of the present invention where an enhanced block acknowledgment frame is transmitted following a number of received frames.

FIG. 5B illustrates a method according to an embodiment of the present invention whereby a block acknowledgment frame is transmitted following a number of received frames. Again, frames are received in act 550. These frames are tracked and a counter is incremented in act 555. In act 560, it is determined whether a trigger counter value has been reached. If it has, a block acknowledgment frame is transmitted in act 565. Again, the block acknowledgement may be an enhanced block acknowledgement as described above or other type of block acknowledgement.

Also, these methods may be combined. For example, if a period of time has passed without the trigger counter value being reached, a block acknowledgment frame may be transmitted. This prevents a transmitting station from only learning that data was not properly received after an excessive period of time.

Figure 5C:
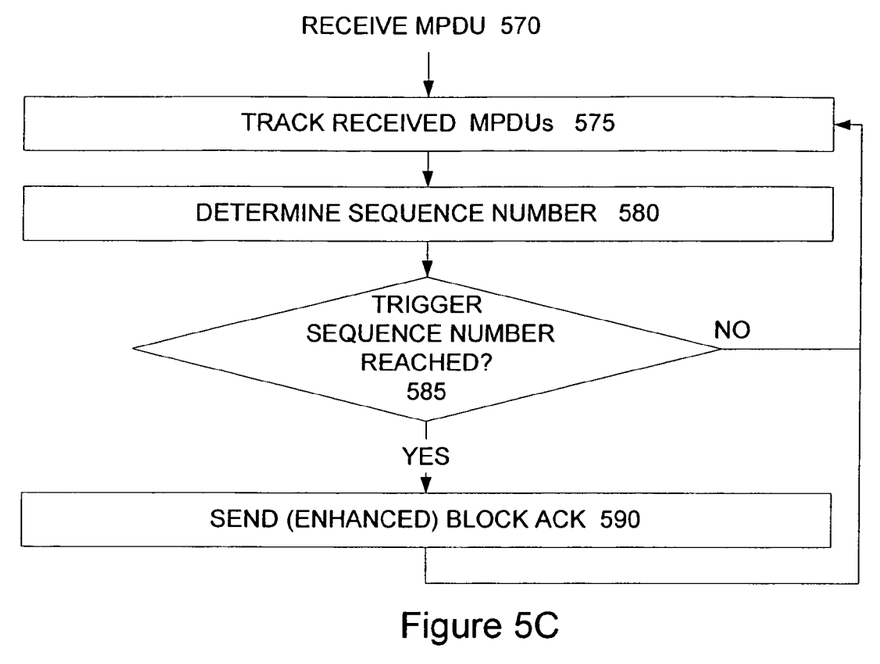

FIG. 5C illustrates a method according to an embodiment of the present invention where a block acknowledgment frame is sent after a specific sequence number has been reached. Typically, each frame to be transmitted is numbered in a sequential manner. Thus, looking for a specific sequence number can be a simple way of determining then number of transmitted frames.

As before, frames are received in act 570, and tracked in act 575. In act 580, a sequence number for a received frame is determined. In act 585, it is determined whether the specific sequence number has been reached. If it has, a block acknowledgment frame is transmitted in act 590. Again, the block acknowledgement may be an enhanced block acknowledgement as described above or other type of block acknowledgement.

Again, these methods may be combined. For example, if a certain period of time expires without the trigger sequence number being reached, a block acknowledgment frame may be sent. This prevents a transmitting station from learning of a transmission error only after an excessive period of time has elapsed.

Figure 5D:
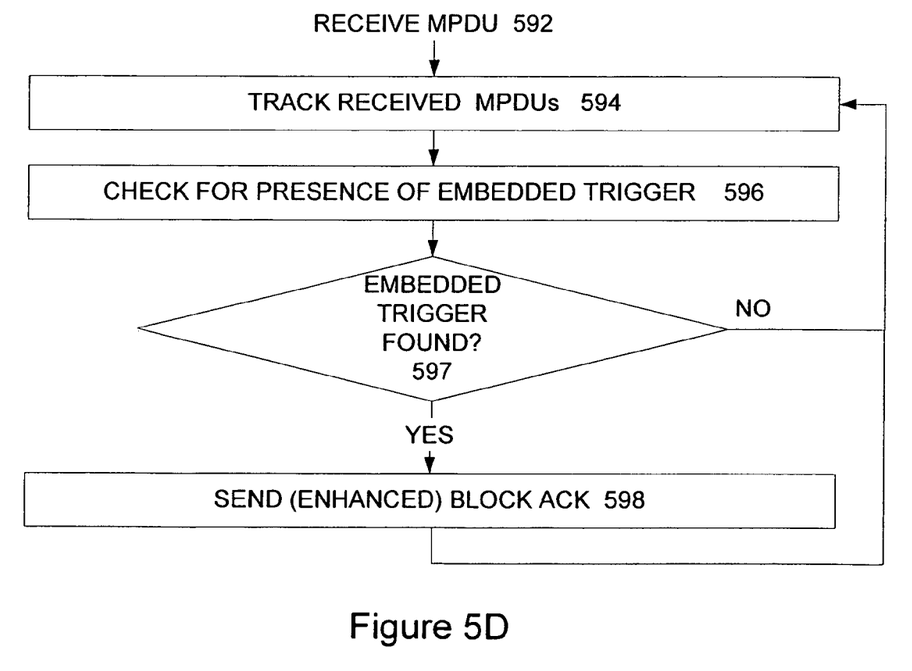
FIG. 5D illustrates a method according to an embodiment of the present invention where a block acknowledgment frame is sent after a frame including an embedded trigger has been received.

These block acknowledgements may alternatively be triggered by data embedded in a received frame. For example, one or more previously reserved bits may be set to act as a trigger for a block acknowledgment that may either be an enhanced block acknowledgment, conventional block acknowledgment, or other type of block acknowledgment. Alternately, other previously defined bits may be redefined for this purpose. An example is shown in the following figure.

FIG. 5D illustrates a method according to an embodiment of the present invention where a block acknowledgment frame is sent after a frame including an embedded trigger has been received. As before, frames are received in act 592, and tracked in act 594, such that a block acknowledgment may be calculated and formatted when needed. In act 597, it is determined whether an embedded trigger has been received. If it has, a block acknowledgment frame is transmitted in act 598. Again, the block acknowledgement may be an enhanced block acknowledgement as described above or other type of block acknowledgement.

Again, these methods may be combined. For example, if a certain period of time expires without an embedded trigger being received, a block acknowledgment frame may be sent. This prevents a transmitting station from learning of a transmission error only after an excessive period of time has elapsed.

Figure 6:
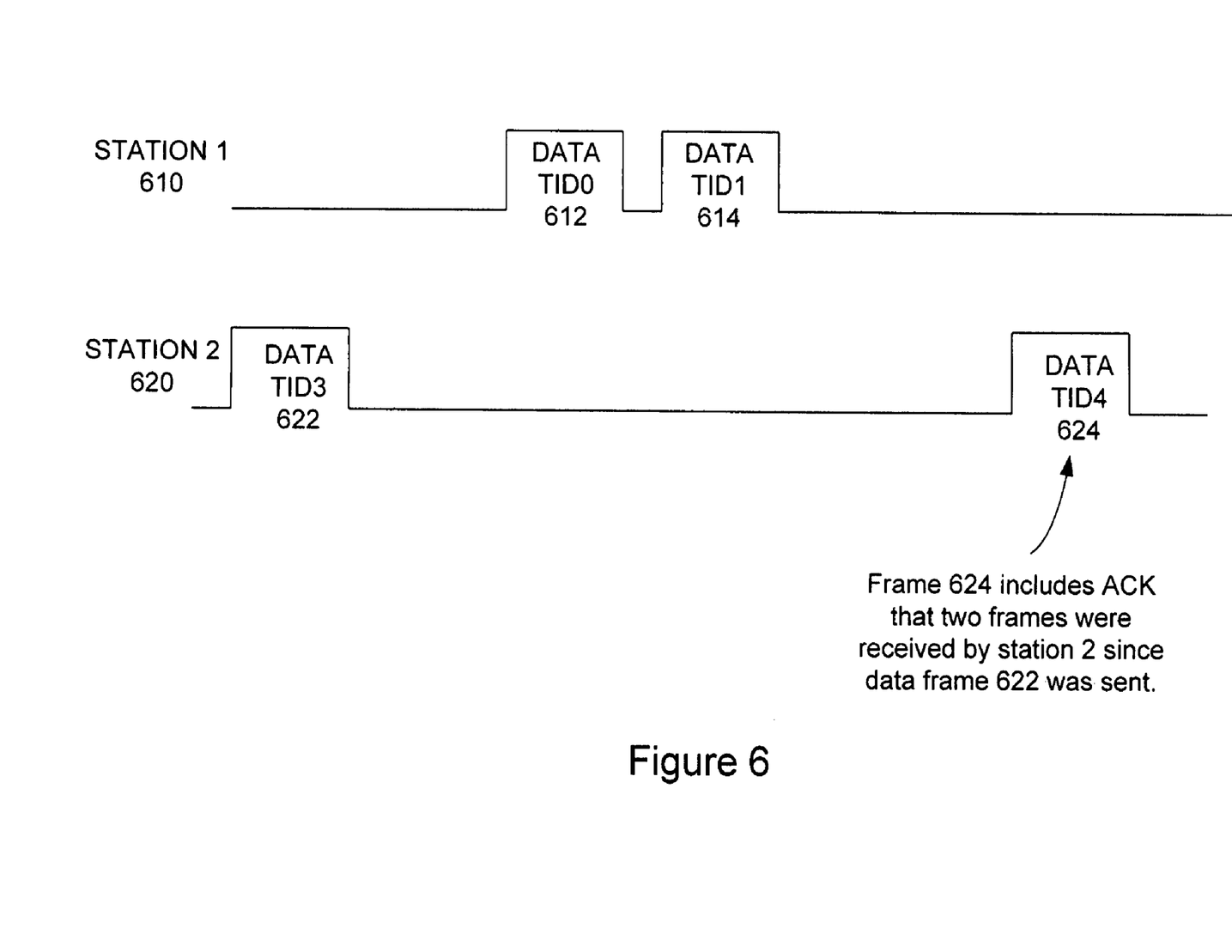
FIG. 6 illustrates a method according to an embodiment of the present invention where an acknowledgment is included in a data frame.

The overhead consumed by these acknowledgment frames, whether enhanced, conventional, or other type, may be reduced by eliminating such acknowledgment frames altogether. For example, this may be done by including acknowledgment information in data frames themselves. For example, a first station may transmit data to a second station. The second station may then send data to the first station, where the data includes an acknowledgement of the data received by the second station since the last transmission by the second station. An example of how this may be done is shown in the following figure.

FIG. 6 illustrates a method according to an embodiment of the present invention where acknowledgment data is included in a data frame. In this example, a second station, station 2 620, transmits a number of frames including data 622. Following this, a first station, station 1 610, transmits two frames, specifically data 612 and data 614. These frames may have the same or different traffic ID numbers. After these two frames, station 2 620 transmits a fourth data frame 624. This fourth data frame includes an acknowledgment that the two frames 612 and 614 were received by station 2 after station 2 620 sent its last frame, specifically data 622.

This method may include a field referred to as a summed acknowledgment field, where the summed acknowledgment field indicates the number of successfully received frames since the receiving station's last transmission. This field may indicate the number of successfully receptions for all traffic, or for specific traffic class IDs, groups of traffic class IDs, user priorities, or other subgroup identifications or characteristics. Alternately, multiple summed acknowledgment fields may be used, each representing their own subgroup of received frames.

These summed acknowledgment fields may be included in one of several locations. For example, they may be in the first field of the payload section of the frame. Alternately, they may be located in a first field at the start of a PSDU, the last field at the end of a PSDU, in a field or frame the following the frame, where the previous frame also indicates the destination of this summed acknowledgment field frame, or some other appropriate location. Errors in the summed acknowledgment field may be determined by the use of cyclic redundancy check (CRC) or other error correction.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of transferring data across a wireless network comprising:
   receiving a first data structure having a first characteristic;
   receiving a second data structure having a second characteristic;
   receiving a request for acknowledgement that the first data structure having the first characteristic and second data structure having the second characteristic were received; and
   transmitting an acknowledgment that the first data structure having the first characteristic and the second data structure having the second characteristic were received.

2. The method of claim 1 wherein a format for the acknowledgement is identified by setting a bit in a format control field.

3. The method of claim 1 wherein the first and second data structures are frames.

4. The method of claim 1 wherein the first characteristic is a first traffic identification and the second characteristic is a second traffic identification.

5. A method of transferring data across a wireless network comprising:
   receiving a first data frame having a first traffic identification;
   receiving a second data frame having a second traffic identification; and
   transmitting a block acknowledgment that the first data frame having the first traffic identification and the second data frame having the second traffic identification were received.

6. The method of claim 5 wherein a format for the block acknowledgement is identified by setting a bit in a field control field.

7. The method of claim 5 further comprising:
   before transmitting the block acknowledgement,
   receiving a block acknowledgement request.

8. The method of claim 5 further comprising:
   before transmitting the block acknowledgement,
   receiving a block acknowledgement request, and
   transmitting a first acknowledgment,
   wherein the first acknowledgment does not specify that the first data frame having the first identification and the second data frame having the second identification were received.

9. The method of claim 5 further comprising:
   before transmitting the block acknowledgement,
   determining that a first duration has transpired.

10. The method of claim 5 further comprising:
    before transmitting the block acknowledgement,
    determining that a first number of frames have been received.

11. The method of claim 5 further comprising:
    before transmitting the block acknowledgement,
    determining that a frame having a first sequence number has been received.

12. A method of transferring data across a wireless network comprising:
    with a first station, transmitting a first data frame having a first traffic identification;
    with the first station, transmitting a second data frame having a second traffic identification;
    with a second station, receiving the first data frame having the first traffic identification and the second data frame having the second traffic identification, and transmitting a block acknowledgment that the first data frame having the first traffic identification and the second data frame having the second traffic identification were received by the second station; and
    with the first station, receiving the block acknowledgment that the first data frame having the first traffic identification and the second data frame having the second traffic identification were received by the second station.

13. The method of claim 12 further comprising:
    before transmitting the block acknowledgement,
    with the first station, transmitting a block acknowledgement request; and
    with the second station, receiving the block acknowledgment request.

14. The method of claim 12 further comprising:
    before transmitting the block acknowledgement,
    with the first station, transmitting a block acknowledgement request, and
    with the second station, receiving the block acknowledgment request and transmitting a first acknowledgment,
    wherein the first acknowledgment does not specify that the first data structure having the first identification and the second data structure having the second identification were received.

15. The method of claim 12 further comprising:
    before transmitting the block acknowledgement,
    with the second station, determining that a first duration has transpired.

16. The method of claim 12 further comprising:
    before transmitting the block acknowledgement,
    with the second station, determining that a first number of frames have been received.

17. The method of claim 12 further comprising:
before transmitting the block acknowledgement,
with the second station, determining that a frame having a first sequence number has been received by the second station.

18. A method of transferring data across a wireless network comprising:
transmitting a first frame;
receiving a second frame having a first traffic identification;
receiving a third frame having a second traffic identification; and
transmitting a fourth frame,
wherein the fourth frame comprises an acknowledgement that the second frame having the first traffic identification and the third frame having the second traffic identification were received.

19. The method of claim 18 wherein the acknowledgement is located in a first field of the payload section of the fourth frame.

20. The method of claim 18 wherein the acknowledgement is located in a first field at the start of a PSDU of the fourth frame.

21. The method of claim 18 wherein the acknowledgement is located in the last field at the end of a PSDU of the fourth frame.

22. The method of claim 18 wherein the acknowledgement is located in a fifth frame the following the fourth frame.

23. The method of claim 18 wherein the acknowledgement is located in a field following the fourth frame.

24. A wireless communications device, comprising:
means for receiving a first data structure having a first characteristic;
means for receiving a second data structure having a second characteristic;
means for receiving a request for acknowledgement that the first data structure having the first characteristic and second data structure having the second characteristic were received; and
means for transmitting an acknowledgment that the first data structure having the first characteristic and the second data structure having the second characteristic were received.

25. A wireless communications device, comprising:
a receiver configured to receive a first data structure having a first characteristic, to receive a second data structure having a second characteristic, and to receive a request for acknowledgement that the first data structure having the first characteristic and second data structure having the second characteristic were received; and
a transmitter configured to transmit an acknowledgment that the first data structure having the first characteristic and the second data structure having the second characteristic were received.

26. A storage device comprising instructions executable by a digital signal processing circuit, the instructions being executable to:
receive a first data structure having a first characteristic;
receive a second data structure having a second characteristic;
receive a request for acknowledgement that the first data structure having the first characteristic and second data structure having the second characteristic were received; and
transmit an acknowledgment that the first data structure having the first characteristic and the second data structure having the second characteristic were received.

27. A wireless communications device, comprising:
means for transmitting a first frame;
means for receiving a second frame having a first traffic identification;
means for receiving a third frame having a second traffic identification; and
means for transmitting a fourth frame, wherein the fourth frame comprises an acknowledgement that the second frame having the first traffic identification and the third frame having the second traffic identification were received.

28. A wireless communication device, comprising:
a transmitter configured to transmit a first frame;
a receiver configured to receive a second frame having a first traffic identification and to receive a third frame having a second traffic identification, wherein the transmitter is configured to transmit a fourth frame comprising an acknowledgement that the second frame having the first traffic identification and the third frame having the second traffic identification were received.

29. A storage device comprising instructions executable by a digital signal processing circuit, the instructions being executable to:
transmit a first frame;
receive a second frame having a first traffic identification;
receive a third frame having a second traffic identification; and
transmit a fourth frame comprising an acknowledgement that the second frame having the first traffic identification and the third frame having the second traffic identification were received.

* * * * *

UNITED STATES PATENT AND TRADEMARK OFFICE
CERTIFICATE OF CORRECTION

PATENT NO. : 7,631,240 B2  Page 1 of 1
APPLICATION NO. : 11/371185
DATED : December 8, 2009
INVENTOR(S) : Frederiks et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 615 days.

Signed and Sealed this

Twenty-first Day of December, 2010

David J. Kappos
*Director of the United States Patent and Trademark Office*